H. HESS.
BALL BEARING.
APPLICATION FILED MAY 29, 1905.

1,002,269.

Patented Sept. 5, 1911.

Witnesses
D. M. Smith
S. T. Washington

Inventor
Henry Hess,
by Fenelon B. Brock
Attorney

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,002,269.     Specification of Letters Patent.     Patented Sept. 5, 1911.

Application filed May 29, 1905. Serial No. 262,925.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings.

One of its objects is to provide a bearing combining the advantages of side filling openings and ball races of curved section, without the disadvantages heretofore found in such constructions.

Well known forms of bearings have side filling openings cut tangent to the bottoms of the races, or even deeper. The objection to this form is due to the fact that at the point of intersection of the filling opening the curve of the race is destroyed, and at one side of the race is converted into a cylindrical section. The carrying capacity of a cylindrical section is very materially less than that of a curved race section. I employ curved races of familiar form, but at the point where the filling opening enters the race the latter is slightly hollowed out, preferably by a spherical cut. The result is that when a ball comes to this place it does not carry any load, since it becomes free, and the load is sustained by the balls on either side. In order to avoid any possible crumbling of the race at the edges of the depression, such edges may be slightly rounded over. The filling opening may be provided in either or both bearing rings.

Figure 1:
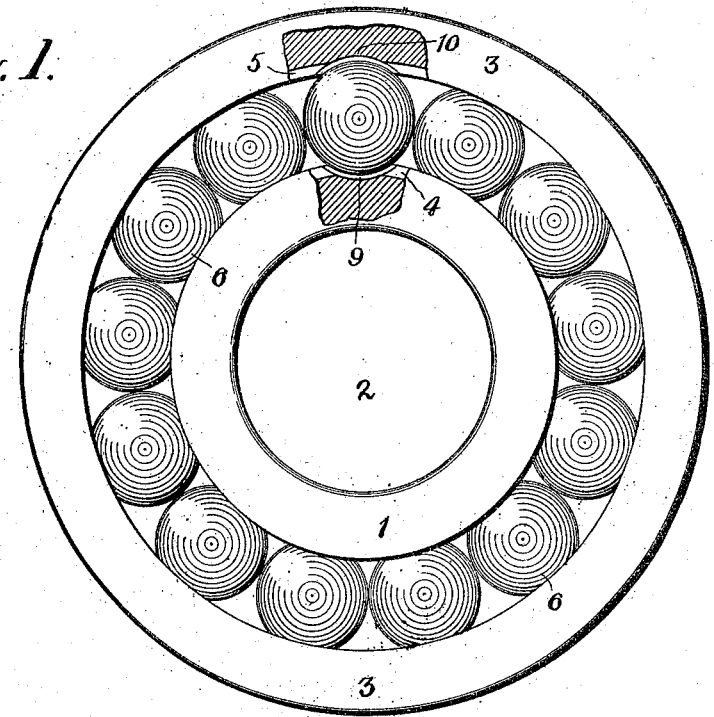
Figure 3:
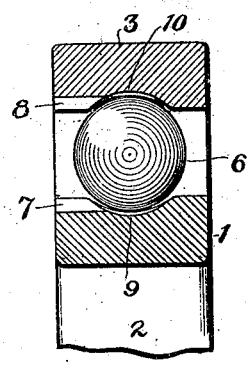
Figure 2:
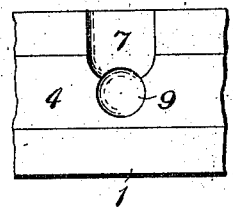

The features and advantages of my invention will be hereafter more fully pointed out in connection with the accompanying drawing, which illustrates exemplifying structures embodying the same, and in which:

Figure 1 is an end elevation of a ball bearing embodying my invention, part of the bearing rings being broken away on a central vertical plane. Fig. 2, a partial plan view of the inner bearing ring, race, filling opening, and spherical cut; Fig. 3, a side sectional elevation at the point of intersection of the filling openings with the races; and Fig. 4, a view similar to Fig. 3 of a modified form of my invention.

1 is an inner bearing ring; 2, a bore in said ring, whereby it may be secured to a shaft in any suitable manner; 3, an outer bearing ring; 4, a ball race carried by ring 1; 5, a corresponding race carried by ring 3; 6, a series of balls running in the races 4, 5; 7, a filling opening entering the race 4; 8, a filling opening entering the race 5.

In ordinary construction as viewed in Fig. 3 the balls would contact with the races at their tops and bottoms, and the filling openings would enter the races at these points at a tangent. This greatly lessens the carrying capacity of the bearings, and if any relative longitudinal movement, or disalinement of the axes of the bearing rings occurs, causes contact of the balls with the edges of the filling openings, which is destructive to the bearing.

9 is a spherical depression formed in race 4 at the point of intersection of the filling opening 7, and 10 is a similar depression in race 5. These depressions relieve the races from working contact with the balls as the latter come opposite them, so that no load comes on the races at these points, and no damage can result from contact of the balls with the edges of the filling openings, even if slight relative longitudinal movement or disalinement of the axes of the bearing rings occurs. The load is carried by the balls on each side of the depressions.

In the form of bearing shown in Fig. 3, after the balls are in place, they may be prevented from accidental exit through the filling openings by closing one or both of the filling openings in any suitable way.

Figure 4:
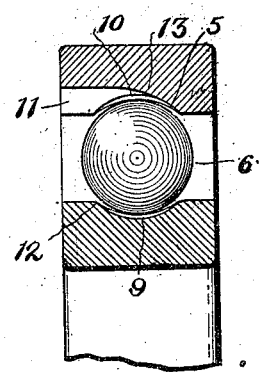

A modification shown in Fig. 4 may be used with especial advantage in cases where the bearing may be so placed that one side of it is not apt to ever receive any load. A filling opening 11 is provided, in one bearing ring only, sufficiently deep to permit the balls to pass between the point 12 in the inner race and the point of intersection 13 of the filling opening with the outer race. In the present instance the bearing may be applied to such a use as a line shaft bearing, where the shaft, to which is secured the inner bearing ring, is the rotary member. The outer ring is fixed, and no load comes on the race 5 at the point of intersection of the filling opening 11. The bearing may be adapted to use in such an application as a vehicle wheel, by cutting the filling opening 11 in the inner bearing ring. In this case the ring 1 is secured to the axle, which is nonrevoluble, while the outer ring 3 is secured to the revolving hub. In either case the filling opening is placed at the top of the bearing.

The last described form of filling opening may be used in connection with the depressions in the races, but is in itself novel, and may be used alone in a wide range of application.

The points of contact of the balls with their races properly follow a single line in each race, and this line of contact is, properly, the greatest circumference of the outer race and the least circumference of the inner race. The depressions 10 and 9, therefore, are properly centered approximately on this contact line.

Many modifications may be made in the structures shown, and I contemplate any such modifications which do not depart from the spirit of my invention.

By reference to Fig. 4 it will be noticed that the filling opening 11 is a cylindrical portion extending from the edge of the bearing ring inward toward the race and a curved portion entering the race and connecting the cylindrical portion with the race. This filling opening is calculated to permit the insertion of the balls in the races with the least possible weakening of the bearing ring. The cylindrical portion of the opening commencing at the edge of the bearing ring is generally sufficiently deep to permit the balls to be inserted freely in the opening between the outer bearing ring and the inner ring. The shape of the curved portion of the opening determines the point of the race where the filling opening enters it. This curved portion may be varied and arranged so that the balls will freely enter the race, or so that they must be forced in order to make them pass the shoulder, indicated by reference character 12, in the figure.

What I claim is:

1. A bearing comprising two rings, each having a race of curved cross section, a series of balls in the races, one of the rings having a filling opening communicating with its race and one of the rings having formed in its race a depression serving to relieve the balls of load adjacent to the filling opening.

2. A ball bearing comprising two opposed bearing rings each having a ball race, a series of balls running in said races, and one of said rings having a filling opening entering its race and a depression in said race at the point where said filling opening enters the race.

3. A ball bearing comprising two opposed bearing rings each having a ball race, a series of balls running in said races, and one of said rings having a side filling opening entering its race and a depression in said race at the point where said filling opening enters the race, the depression serving to prevent contact of balls under load with the edges of the filling opening.

4. A ball bearing comprising two bearing rings, each having a ball race, a series of balls running in said races between the rings; each of the rings having a side filling opening entering its race, and a depression in said race at the point at which the filling opening enters the race.

5. A bearing comprising two rings, each having a race of curved cross-section, balls in the races, one of the rings having a filling opening communicating with its race, said ring also having a depression in its race extending to each side of the filling opening.

In testimony whereof I have affixed my signature in the presence of two witnesses.

HENRY HESS.

Witnesses:
THEO. H. McCALLA,
NETTIE L. HAHN.